Feb. 15, 1966  F. J. POKORNY ET AL  3,235,681
MECHANISM FOR POSITIONING CIRCUIT BREAKER IN COMPARTMENT
Filed Feb. 1, 1961  6 Sheets-Sheet 1

INVENTORS
FRANK J. POKORNY
GEORGE A. WILSON
BY
OSTROLENK, FABER, GERB & SOFFEN
ATTORNEYS

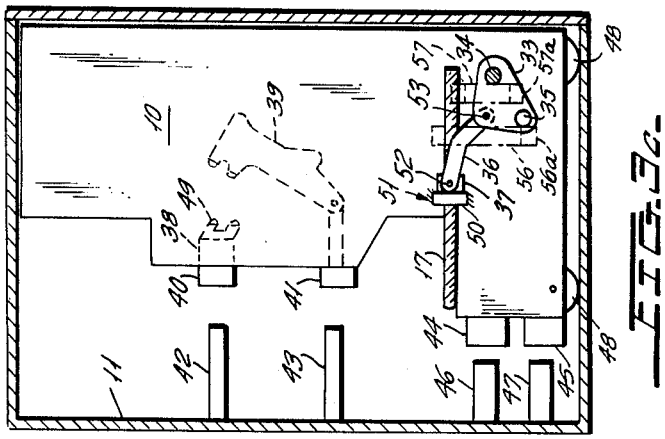
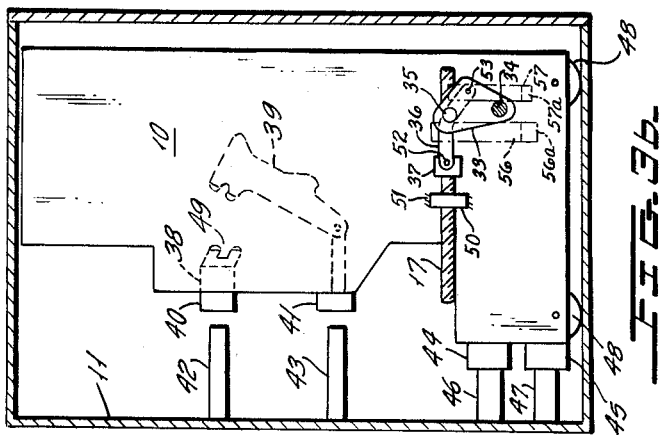
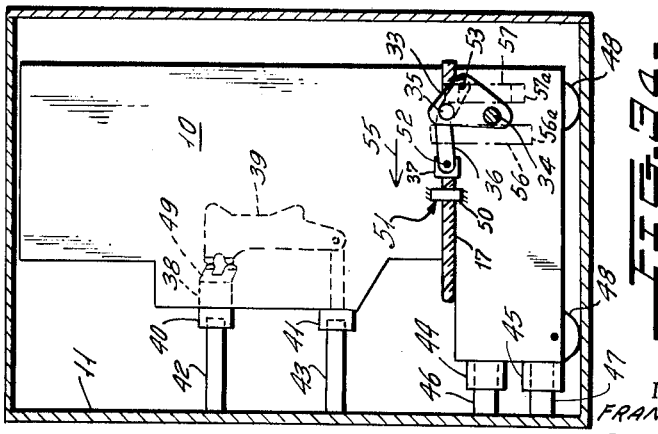

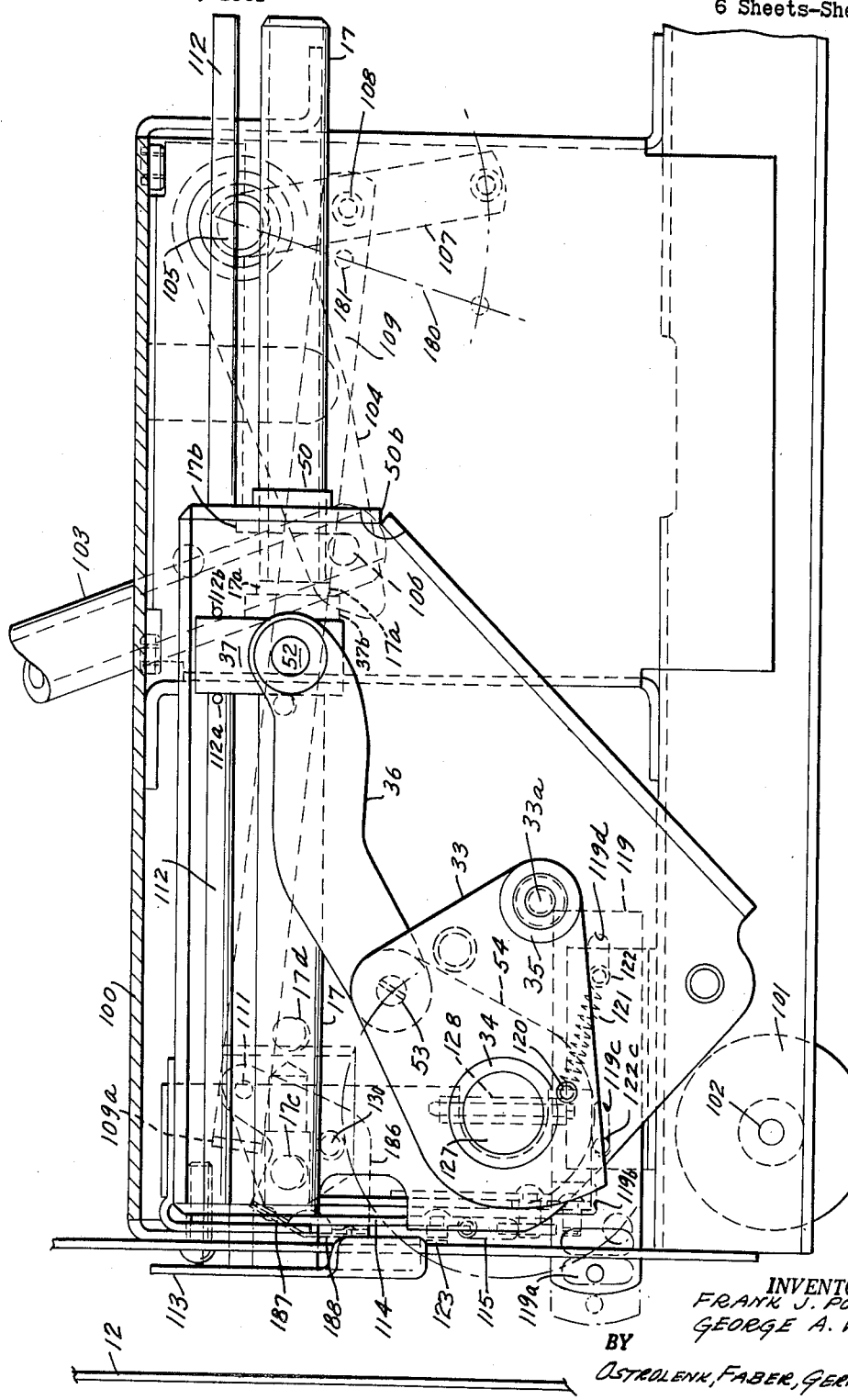

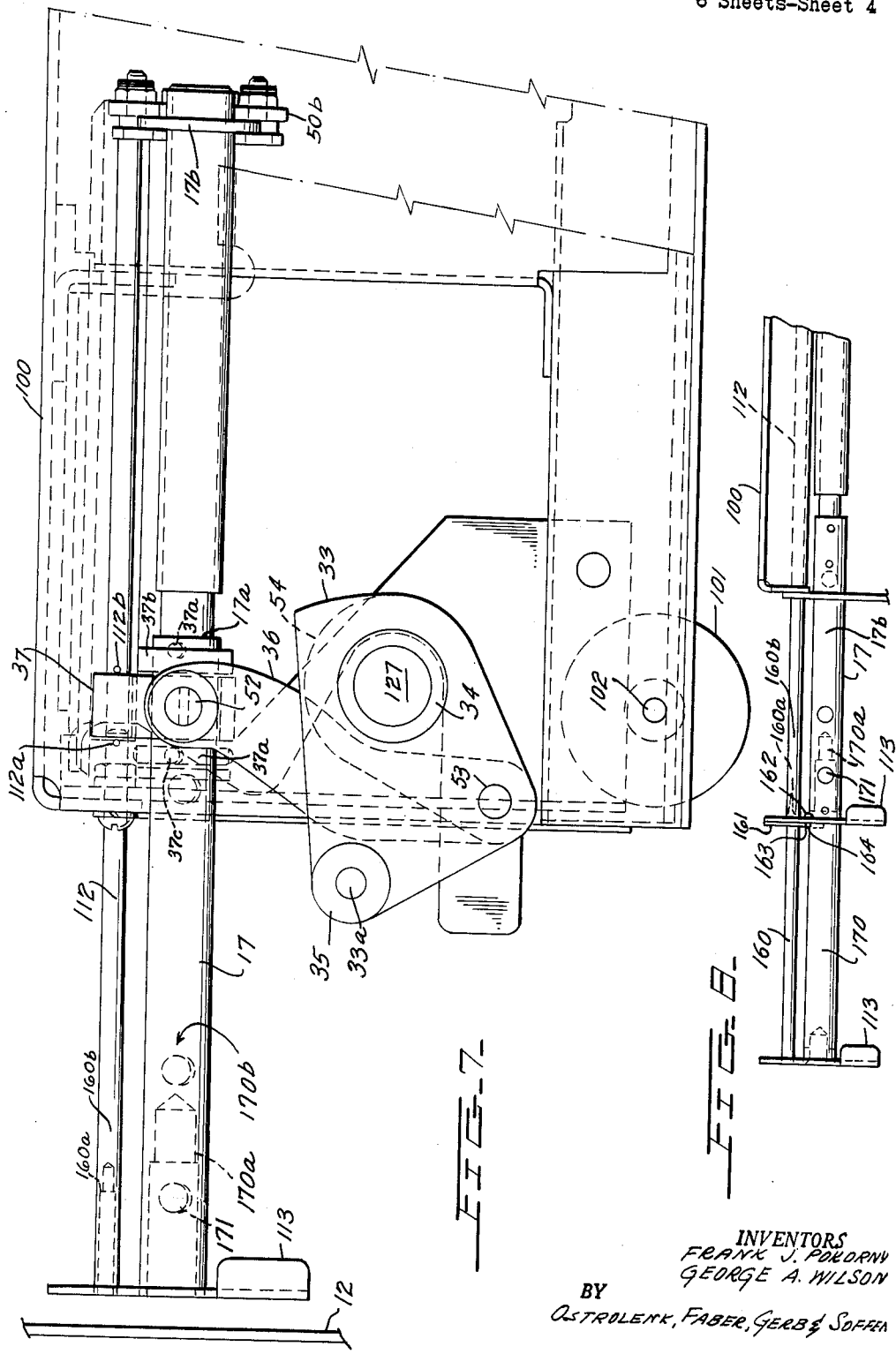

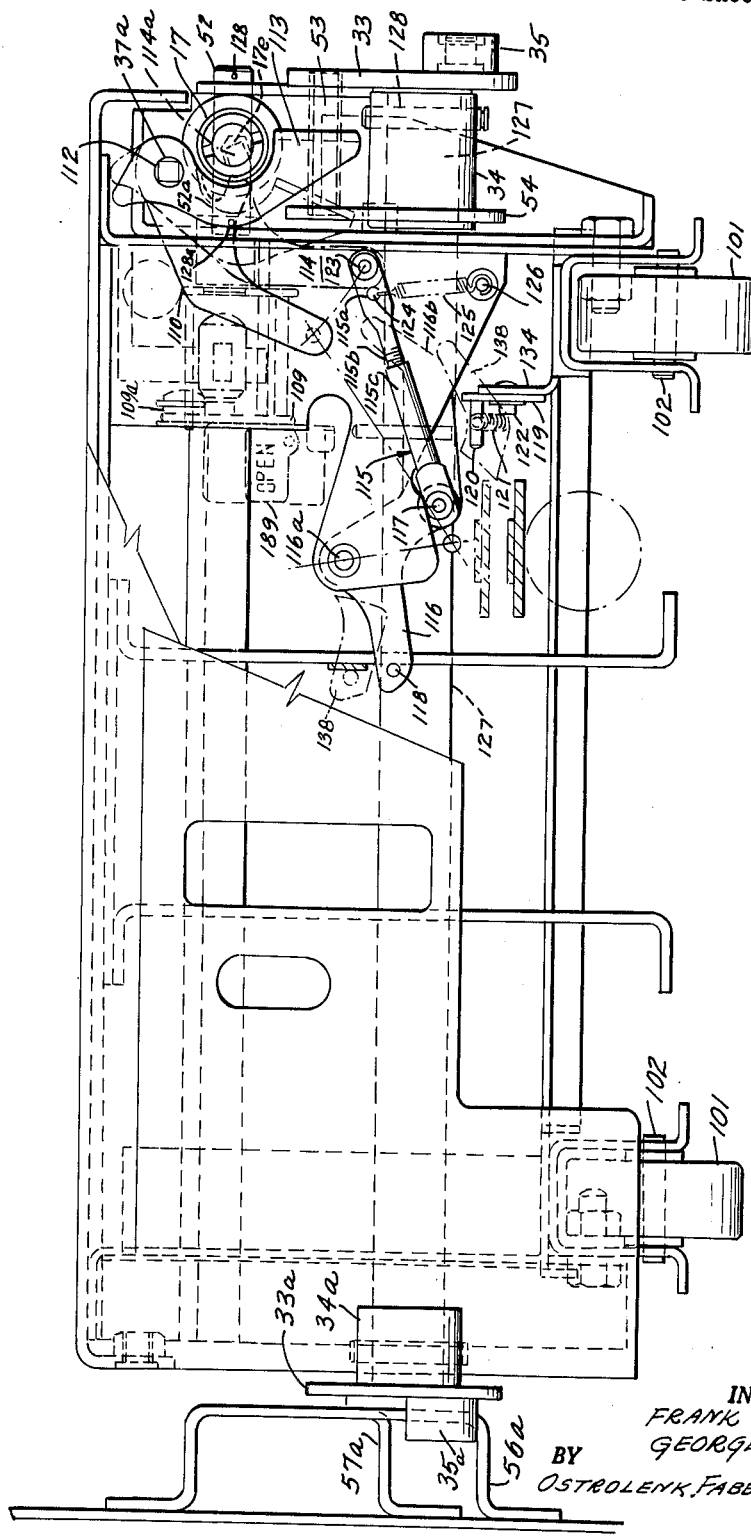

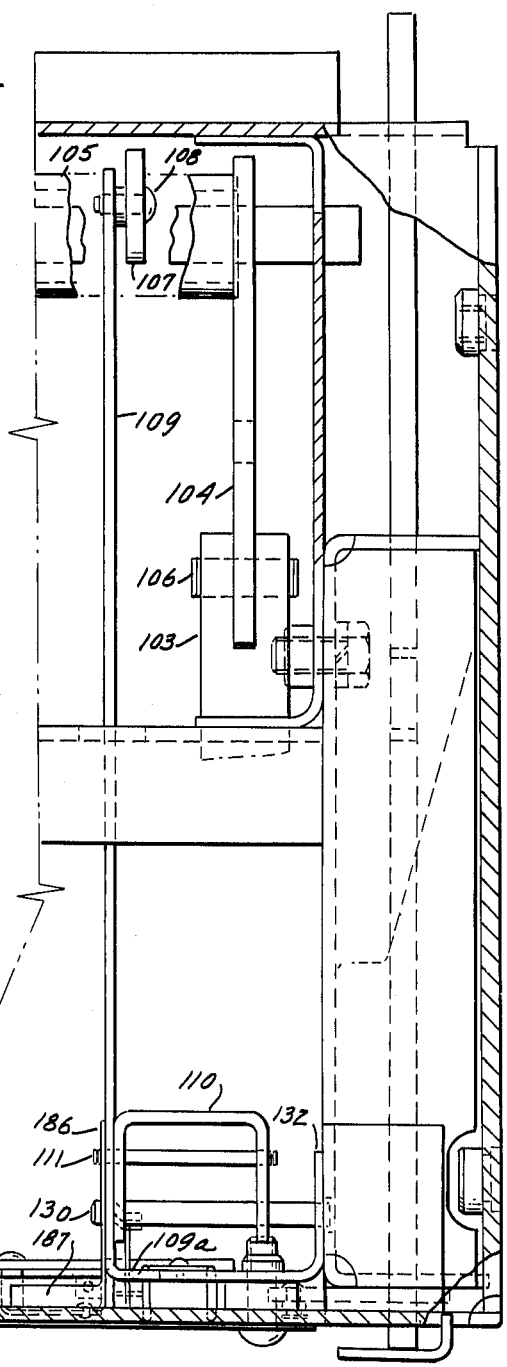

3,235,681
MECHANISM FOR POSITIONING CIRCUIT
BREAKER IN COMPARTMENT
Frank J. Pokorny, Hatboro, and George A. Wilson, Media,
Pa., assignors to I-T-E Circuit Breaker Company, Philadelphia, Pa., a corporation of Pennsylvania
Filed Feb. 1, 1961, Ser. No. 86,349
6 Claims. (Cl. 200—50)

Our invention relates to circuit breakers and, more particularly, to circuit breakers having a novel racking mechanism whose relative movement permits the racking operation to be performed without opening the circuit breaker compartment door.

Prior art circuit breakers utilize racking mechanisms for moving the circuit breaker between a fully connected and a fully disconnected position with respect to the stationary disconnects housed in the breaker compartment. The circuit breaker of our invention is mounted on rollers and is moved relative to the breaker compartment by manual operation of the racking mechanism. A rotating member of the racking mechanism which moves in response to the manual operation engages a bracket on the interior sidewall of the breaker compartment, the movement of the rotating member causing the circuit breaker to move in or out of the breaker compartment.

In order to prevent movement of the circuit breaker when the breaker cooperating contacts are closed, prior art breakers utilize an interlock means which prevents movement of the circuit breaker towards disengagement when the cooperating contacts are closed. The racking mechanism of our invention further includes stop means for locking the breaker in each of its plurality of positions automatically without need for guesswork by the operator as to how far the circuit breaker must be moved to place it in the desired position.

Since the circuit breaker moves away from the compartment door in engaging the stationary disconnects, the racking mechanism requires that the compartment door be opened for swift and simple performance of the racking operation. To overcome this, the prior art has lengthened the cranking handle so that the racking mechanism may be reached without opening the breaker compartment. It is, however, difficult to mount the cranking handle to the racking mechanism when the circuit breaker is in the fully connected position since the hole in which the cranking handle is inserted cannot be clearly seen from the exterior of the breaker compartment.

The racking operation is made more tedious due to the need for the removal of the cranking handle and reinsertion into another hole in the racking mechanism. The reason for this is that one pumping stroke is insufficient to move the circuit breaker from one position to the next but a number of pumping strokes are required.

In our novel invention, we provide a circuit breaker in which the racking mechanism is so arranged to have longitudinal movement relative to the circuit breaker while the circuit breaker is moving relative to the breaker compartment. The member engaged by the cranking handle, therefore, does not move relative to the breaker compartment. The engaging member, which is positioned adjacent the opening in the compartment door remains in that position throughout the entire racking operation. This enables the engaging member to be clearly seen from the exterior of the breaker compartment making the insertion of the cranking handle a simple task.

Our novel racking mechanism is further designed to be activated by rotary or circular movement of the cranking handle rather than pumping movement as in the prior art. The cranking handle in our novel racking mechanism need only be inserted once during the racking operation thus avoiding the continuous removal and reinsertion of the cranking handle as required in prior art circuit breakers. Also the pumping operation of the cranking handles of the prior art necessitated a larger opening in the breaker compartment door to permit the cranking handle to move up and down without interference from the compartment door. The rotary cranking permits a much smaller compartment door opening thus providing a greater measure of safety for the operators.

Our novel racking mechanism is further arranged to lock its rotary movement at each position which the circuit breaker is capable of assuming, thus guaranteeing exact positioning of the circuit breaker in each position without relying on the guesswork of the operator. The lever which locks the rotary movement moves along with the circuit breaker to be easily accessible throughout the racking operation. The locking lever is restrained from any movement while the breaker contacts are engaged to prevent the circuit breaker disconnects to be separated from the stationary disconnects. The locking lever is also restrained from any movement to prevent the circuit breaker disconnects to engage the stationary disconnects when the circuit breaker cooperating contacts are engaged. These features protect the operator from any danger of arcing during the racking operation.

It is therefore one object of our invention to provide a circuit breaker having a novel racking mechanism which automatically latches the circuit breaker in each position.

Another object of our invention is to provide a circuit breaker having a novel racking mechanism which is operated by a cranking arm which moves the circuit breaker between a fully connected and fully disconnected position in response to rotational movement of a cranking lever.

Another object of our invention is to provide a novel metal-clad circuit breaker which is movable between a fully connected and a fully disconnected position without opening the compartment door.

Still another object of our invention is to provide a circuit breaker having a novel racking mechanism which is accessible to an operator throughout the entire racking operation without opening the breaker compartment.

Another object of our invention is to provide a racking mechanism for a circuit breaker which is so arranged as to prevent movement of the circuit breaker when the breaker contacts are in an engaged position.

Still another object of our invention is to provide a novel racking mechanism for a circuit breaker relative to the circuit breaker which is so arranged to have a longitudinal movement which is opposite in direction to the movement of the circuit breaker, but which does not move at all, relative to ground.

These and other objects of our invention will now be apparent from the following description when read in connection with the drawings, in which:

FIGURES 3a through 3c are side plan views of the circuit breaker of FIGURE 1 showing the circuit breaker in the connected, test and disconnected position respectively.

FIGURES 6, 7, 8 and 11 are side views of the racking mechanism shown in FIGURES 3a through 3c.

FIGURES 9 and 10 are front and top views respectively of the racking mechanism of FIGURES 3 through 5.

Figure 1:
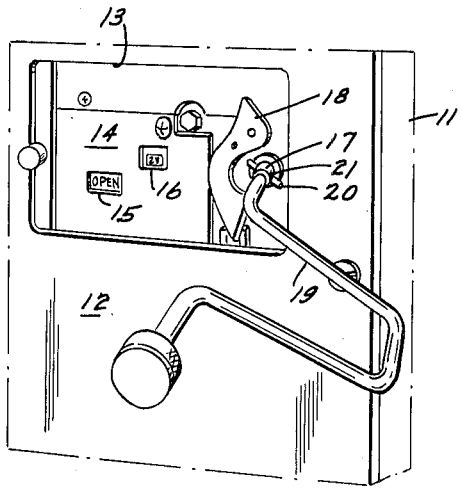
FIGURE 1 is a perspective view of the circuit breaker showing the breaker compartment closed.

Referring now to the drawings, FIGURE 1 shows circuit breaker 10 shown in broken lines housed in breaker compartment 11. Compartment 11 is constructed of a heavy duty metal and is suitably grounded to protect the operator from the energized elements of circuit breaker 10. Door 12 of compartment 11 has an opening 13 which enables an operator to gain access to the racking mechanism (not shown) of circuit breaker 10. The portion of the front panel 14 of circuit breaker 10 exposed by opening 13 has mounted thereon: an indicator window 189 showing the condition of the breaker contacts (not shown); a counter 16 which automatically keeps a count of the number of times circuit breaker 10 has been closed; a keyed racking screw 17 and a locking lever 18. Keyed racking screw 17 is engageable with a racking crank 19. Racking crank 19 locks into racking screw 17 by positioning pins 20 of the racking crank 19 into the associated slits 21 in racking screw 17. Racking screw 17 and locking lever 18 control the movement of circuit breaker 10 in compartment 11 as will be more fully described.

Figure 2:
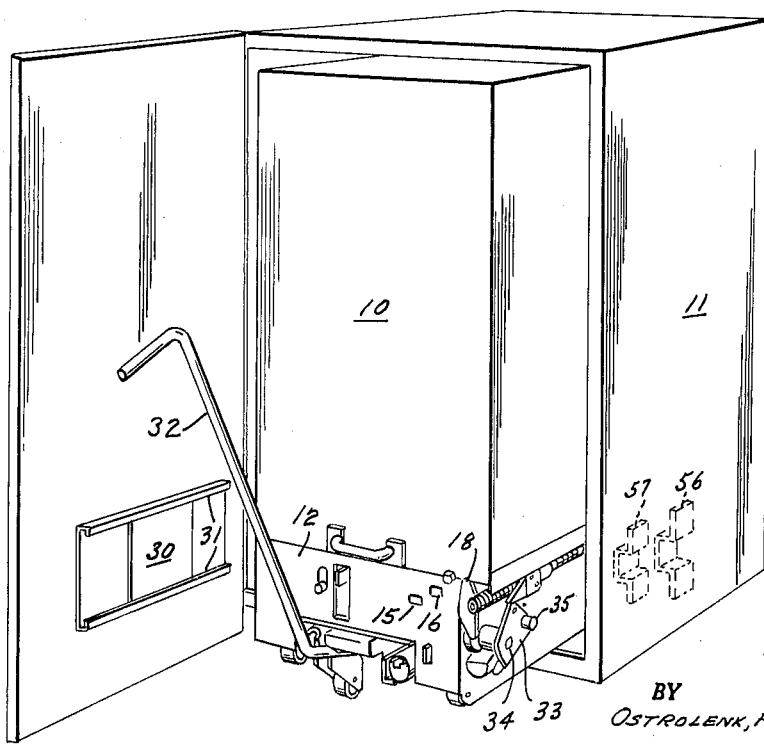
FIGURE 2 is a perspective view of the circuit breaker of FIGURE 1 showing the compartment door open and the circuit breaker partially removed.

In FIGURE 2, circuit breaker 10 is shown partially removed from compartment 11. Sliding panel 30 is longitudinally movable between runners 31 to cover opening 13 in the compartment door 12, thus completely closing the compartment during normal operation of circuit breaker 10. "Fifth wheel" 32 is used to aid the operator in moving the circuit breaker 10 from the position shown in FIGURE 2 to that shown in FIGURE 3 as will be more fully described.

Rotating arm 33 is pivotally mounted to shaft 34 and rotates in response to the rotation of racking screw 17 by racking crank 19. Roller 35 which is pivotally mounted to rotating member 33, engages a bracket (not shown) on the interior side wall of compartment 11. The arc transcribed by the movement of roller 35 about shaft 34 during the racking operation drives the circuit breaker into the compartment 11 when circuit breaker 10 is moved towards the fully connected position and out of compartment 11 when circuit breaker 10 is moved towards the fully disconnected position.

FIGURES 3a through 3c show the circuit breaker 10 in the connected, test and disconnected positions respectively. Primary disconnects 40 and 41 of circuit breaker 10 engage stationary disconnects 42 and 43 respectively, which are secured to compartment 11. The opposite ends of disconnect 40 is connected to stationary conductive head 38 while movable bridge 39 is connected to disconnect 41. The contact structure 49 may be of any suitable design such as described in U.S. application, Serial No. 79,425, and December 29, 1960, entitled, "Stationary Contact Structure for Circuit Breaker," by F. J. Pokorny and G. Wilson, and assigned to the same assignee as the instant invention. It should be noted that the contact structure referred to is cited as merely exemplary since it plays no part in the novelty of my invention.

Racking screw 17 has a worm gear cut along its periphery. Nut 50 engages racking screw 17 at end 51. Stationary nut 50 is fixedly mounted to the circuit breaker carriage by suitable means such that stationary nut 50 is restrained from both translational and rotationl movement. Stationary nut 50 is threaded to engage the worm gear on racking screw 17 so that the nut 50, and consequently the circuit breaker 10 moves longitudinally with respect to the racking screw 17 when it is rotated by racking crank 19.

Block 37 has an opening to receive racking screw 17 therethrough. Connecting link 36 is pivotally mounted to block 37 at pivot 52 and to rotating members 33 and 54 (not shown) by shaft 53. The mounting of block 37 prevents rotational movement block 37. Block 37 is held by means of collars 37a and 37b (see FIGURE 7) which collars are mounted adjacent the left and right-hand edges respectively of block 37. The collars 37a and 37b are secured to racking screw 17 by means of pins 37c and 37d respectively. The movement nut 50, and consequently circuit breaker 10 and shaft 34 determines the position which circuit breaker 10 assumes as will be more fully described.

For the sake of analysis, consider FIGURE 3a, and further consider that circuit breaker 10 (and therefore nut 50 and shaft 34) is fixed. If the racking screw 17 were rotated counter-clockwise, the only possible way for the racking screw to go (since nut 50 is hypothetically fixed) would be to the right and out of the front door of the breaker compartment 11. However, since shaft 34 is fixed (in this discussion) and roller 35 is limited from any linear motion by bracket 57, connecting link 36 cannot move. Therefore, block 37 and racking screw 17 cannot move. Consequently, if racking screw 17 has no freedom to move to the right when it is turned counter-clockwise, then it must follow that the result of turning racking screw 17 counter-clockwise, would be that circuit breaker 10 (nut 50 and shaft 34) must move to the left in the direction of arrow 55 and into the compartment 11, causing the rotating member 33 and roller 35 to rotate clockwise.

Figure 4:
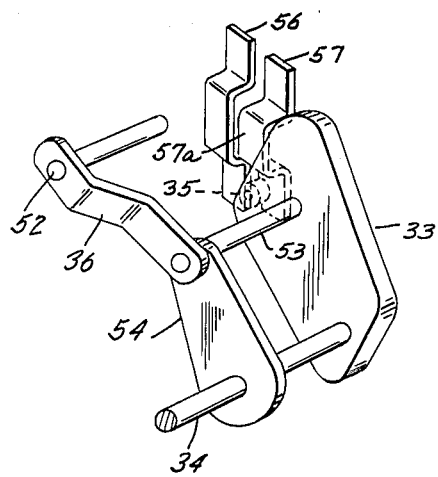
FIGURE 4 is a perspective view of a portion of the racking mechanism shown in FIGURE 1.

In the position shown in FIGURE 3a, rotating member 33 has been rotated clockwise causing roller 35 to assume a position against bracket 56 which places circuit breaker 10 in the fully connected position. FIGURE 4 shows the physical configuration of brackets 56 and 57.

To analyze the sequence of events when racking screw 17 is rotated clockwise, consider what happens when once again circuit breaker 10 (and nut 50) is considered fixed. When racking screw 17 is rotated clockwise with nut 50 hypothetically fixed, racking screw 17 would like to pass through nut 50 toward the back end of breaker compartment 11. However, roller 35 (and consequently collar 37), which is stopped by breaker 56, prevents such movement and therefore the only result of rotating racking screw 17 clockwise must be to draw nut 50 (and circuit breaker 10) toward the front of breaker compartment 11.

Such clockwise rotation of racking screw 17 causes rotating member 33 to rotate counter-clockwise about shaft 34 thereby moving roller 35 to the angular position shown in FIGURE 3b. The movement of circuit breaker 10 to the right moves primary disconnects 40–43 out of engagement. Secondary disconnects 44 through 47, however, remain in partial engagement. This is the test position which enables the operator to check the operation of the circuit breaker contacts and other moving elements without danger of operating the breaker when the primary disconnects are in an energized state. It should be noted that circuit breaker 10 is prevented from moving from the position shown in FIGURE 3a (fully connected position) to the position shown in FIGURE 3b (test position) when cooperative contacts 49 are engaged. This safety feature is accomplished by an interlocking means (not shown) which will be more fully described.

As racking screw 17 is rotated still further in the clockwise direction, the circuit breaker 10 and consequently shaft 34 continue to move to the right. Since collar 37 is fixed on racking screw 17 by collars 37a–37b, movement of shaft 34 to the right causes the rotating member 33 to rotate counter-clockwise and consequently roller 35 moves down to the position shown in FIGURE 3c.

Secondary disconnects 44–47, as well as primary disconnects 40–43, are now disengaged. Roller 35 is no longer adjacent to the vertical central portion 57a of bracket 57 (see FIGURE 4 also), permitting circuit breaker 10 to be moved to the right by the operator since bracket 57 does not interfere with the horizontal movement to the right of roller 35. Circuit breaker 10 may now be either partially or completely removed from compartment 11 for inspection and/or maintenance.

Figure 5:
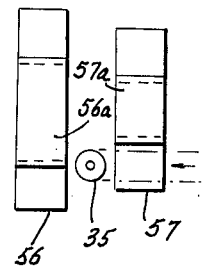
FIGURE 5 is a side plan view of a portion of the racking mechanism shown in FIGURES 3a through 3c.

When circuit breaker 10 is returned to compartment 11 after inspection, the circuit breaker 10 is moved into the compartment 11 by hand until roller 35 abuts the edge 56a of bracket 56 (see FIGURE 5) which prevents circuit breaker 10 to be moved any further to the left unless racking screw 17 is operated. It should be noted that circuit breaker 10 cannot be inserted into compartment 10 unless roller 35 is in the position shown in FIGURE 3c. Also when circuit breaker 10 is moved by hand to the position shown in FIGURE 3c, racking screw 17 may not be rotated unless breaker contacts 49 are disengaged. This interlocking function is performed by an interlocking means to be more fully described.

FIGURES 6 through 11 show the racking mechanism in greater detail. The racking mechanism is housed in the carriage 100 of circuit breaker 10. A pair of wheels 101 are pivotally secured to carriage 100 at pivots 102 to permit circuit breaker 10 to be easily moved. Block 37, the function of which was described in connection with FIGURES 3a through 3c, is shown abutting a stop member 17a which is fixedly secured to racking screw 17. Stop member 17a, collar 38b and, subsequently, maintains block 37 in a fixed position on (see FIGURE 6) racking screw 17. Stationary nut 50 is fixedly secured to plate 50b which is fixedly mounted to carriage 100 in any suitable manner. Stop member 17b abuts and strengthens plate 50b.

Unlocking shaft 112, which has a rectangular cross-section (see FIGURE 9), passes through an aperture 37a in block 37. Pins 112a and 112b pass through shaft 112 preventing any linear movement of shaft 112. Shaft 112, however, is free to rotate about its own axis. Locking lever 114 and unlocking handle 113 are fixedly secured to unlocking shaft 112. Locking lever 114 has a projection 114a which engages one of the apertures 17c, 17d or 17e in racking screw 17 when such aperture is adjacent the projection 114a of locking lever 114. Locking lever 114 is urged against racking screw 17 by spring 125 which is mounted between aperture 124 and fixed pin 126. By moving unlocking handle 113 clockwise about shaft 112 projection 114a is moved out of engagement with aperture 17c enabling racking screw 17 to rotate about its own axis.

Pins 52 and 52a which are mounted on opposite sides of block 37 (see FIGURE 9) engage connecting links 36 and 36a respectively. Pins 128 and 128a prevent links 36 and 36a from being disengaged from pins 52 and 52a. The opposite ends of connecting links 36 and 36a are pivotally mounted to shaft 53 which also engages rotating members 33 and 54. Members 33 and 54 are fixedly secured to shaft 34 which shaft rotates with the rotation of members 33 and 54. Shaft 127 is inserted and fixedly secured in an aperture of shaft 34 which imparts rotation to shaft 127. The opposite end of shaft 127 is fixedly secured to shaft 34a which rotates in response to shaft 127 and subsequently imparts rotation to rotating member 33a in the same manner as shaft 34 moves rotating members 33 and 54. Roller 35a, which is pivotally mounted to rotating member 33a, is operatively associated with brackets 56a and 57a which are secured to the side wall of compartment 11. Like brackets (not shown) cooperate with roller 35.

A portion of the operating mechanism of circuit breaker 10, shown in FIGURES 6 and 10, consists of operating arm 104 which is pivotally mounted to shaft 105. Pushrod 103 is pivotally connected to operating arm 104 at 106 while the opposite end of pushrod is pivotally connected to the movable bridge 39 (see FIGURES 3a–3c). Pushrod 103 in response to the movement of operating arm 104 moves bridge 39 (see FIGURES 3a–3c) between an engaged and a disengaged position. A more thorough description of an operating mechanism which may be utilized in circuit breaker 10 is set forth in U.S. application Serial No. 79,734 filed December 30, 1960, now Patent No. 3,171,938, entitled, "Operating Mechanism for Circuit Breaker," F. J. Pokorny, and assigned to the same assignee as the instant invention. It should be understood that the operating mechanism referred to above plays no part in the novelty of the instant invention and is cited as merely exemplary.

Arm 107 is fixedly secured to shaft 105. Connecting link 109 is pivotally mounted to arm 107 at 108. The opposite end of link 109 is pivotally mounted to U-shaped rotating lever 110 by pin 111. Lever 110 is pivotally mounted to pin 130 which pin is fixedly secured to plates 131 and 132 which are part of the carriage 100 superstructure. When operating arm 104 rotates clockwise about shaft 105, arm 107 rotates clockwise moving link 109 to the left and moving lever 110 counter-clockwise operating counter 133 and impeding the movement of locking lever 114 as will be more fully described.

Locking lever 114 is linked to one end 115a of member 115 at 123. The opposite end 115c of member 115 is pivotally mounted to bell crank lever 116 at 117. Bell crank lever 116 is mounted to rotate about pin 116a. The opposite end of bell crank lever 116 is pivotally connected to the manual trip mechanism (not shown) of the circuit breaker 10, thus insuring that circuit breaker 10 is tripped when racking screw 17 is being rotated or conversely prevents the rotation of racking screw when circuit breaker 10 is closed in a manner to be more fully described.

A locking plate 119 is mounted to carriage 100 by plate 134 and pins 122 and 122c but is capable of longitudinal movement by means of elongated apertures 119d and 119c through which pins 122 and 122c pass. Spring 121 is mounted to pin 120 on plate 119 and pin 122 which is secured to plate 134. Spring 121 urges locking plate 119 to the right (see FIGURE 6) placing slot 119b in a position to permit the end portion 116b of bell crank lever 116 to enter slot 119b so that circuit breaker 10 may be tripped. By moving locking plate 119 to the left bell crank lever 116 is no longer permitted to rotate in the clockwise direction. Due to the linkage between bell crank lever 116 and locking lever 114 by means of linking member 115, locking member 114 is prevented from rotating in the clockwise direction causing projection 114a to remain in engagement with aperture 17c, thereby preventing rotation of racking screw 17. A padlock (not shown) may be inserted through aperture 119a in locking plate 119 which padlock will hold locking plate in its left-hand position. This feature is utilized to prevent an operator from racking a circuit breaker which is in the process of being inspected and/or repaired.

As was fully explained in the description of FIGURES 3a through 3c, the left-hand end (see FIGURES 6, 7 and 8) of racking screw 17 remains immediately adjacent compartment door 12 throughout the racking operation. If, however, it is desired to use a deeper compartment, adapters 160 and 170 are provided. Racking screw adapter 170 has a projection 170a which is inserted into the well 170b in racking screw 17. Screw 171 is utilized to rigidly secure adapter 170 to racking screw 17. Locking shaft adapter 160 has a projection 160a which is fitted into well 160b of locking shaft 112. A plate 161 which is fixedly secured to adapter 160 is fastened by bolt 162 which passes through apertures 163 and 164 in unlocking handle 113 and plate 161 respectively to fixedly secure locking shaft adapter 160 to locking shaft 112. This permits the circuit breaker 10 using our novel racking mechanism to be used in breaker compartments of varying depth while still retaining the advantages of our racking mechanism.

The operation of the racking mechanism, in connection with FIGURES 2 and 6 through 11, is as follows: with circuit breaker 10 shown in the fully connected position (shown in FIGURE 6) racking handle 19 (not shown) is inserted through the opening 13 (see FIGURE 2) in compartment door 12 and into engagement with racking screw 17. Cranking handle 19 is in rigid engagement with racking screw 17 when pins 20 on cranking handle 19 engage slits 21 on racking screw 17.

Unlocking handle 113 is then rotated clockwise about locking shaft 112 against biasing spring 125 moving projection 114a of locking member 114 out of engagement with aperture 17e in racking screw 17. The operating arm 104 must be in the position shown in FIGURE 6 (which means that the breaker contacts are disengaged). When operating arm 104 is in the position shown in FIGURE 6 (which means that the breaker contacts are disengaged), rotating lever 110 does not abut locking lever 114 permitting locking lever 114 to be rotated in the clockwise direction. Rotating lever 110 thereby permits the racking out of circuit breaker 10 only when the circuit breaker contacts are disengaged. It can be seen, therefore, that circuit breaker 10 must be tripped before starting the racking operation.

Locking lever 114 is rotated clockwise about the axis of locking shaft 112 moving projection 114a out of engagement with aperture 17e. Racking crank 19 is rotated clockwise one quarter of a turn which movement rotates racking screw 17 in the same direction. Unlocking handle 113 may now be released since aperture 17c is no longer in position to engage projection 114a.

As was explained previously, clockwise rotation of racking screw 17 drives circuit breaker 10 to the right and towards the front door 12 of the breaker compartment 11. Locking lever 114 is slidably mounted on the locking shaft 112 so that it is free to move along with circuit breaker 10. It is linked to circuit breaker 10 through member 115 and bell crank lever 116. This movement continues until projection 114a of locking lever 114 subsequently moves into alignment with aperture 17d in racking screw 17.

Projection 114a is urged into engagement with aperture 17d under the influence of biasing spring 125, preventing further rotation of racking screw 17. When this condition is achieved, the operator is appraised of the fact that circuit breaker 10 is in the test position (see FIGURE 3b). This automatic operation automatically "finds" the test position of the circuit breaker avoiding the necessity of the operator to estimate how much cranking is necessary to move circuit breaker 10 from the fully connected position (FIGURE 3a) to the test position (FIGURE 3b).

While circuit breaker 10 is in the test position, the operator may perform various tests to ascertain whether the circuit breaker 10 is performing properly. If the operator desires to inspect the contact surfaces or any other enclosed elements of circuit breaker 10, the racking operation must be continued. To move circuit breaker 10 from the test position of FIGURE 3b to the fully disconnected position (see FIGURE 3c) he need only to move unlocking handle 113 to the left as previously explained and rotate cranking lever 19 in the clockwise direction. The movement of the racking mechanism elements from the test position to the fully disconnected position is the same as the movement of the racking mechanism elements in going from the fully connected position to the test position.

Circuit breaker 10 automatically locks in to the fully disconnected position when aperture 17c moves into alignment with projection 114a as was previously explained. As this instant brackets 57 and 57a no longer impede the movement of rollers 35 and 35a respectively so that circuit breaker 10 may be moved manually to the left (see FIGURES 6 and 3c) for complete removal of circuit breaker 10 from compartment 11.

The operation of the racking mechanism for placing the circuit breaker 10 back into the fully connected position shown in FIGURE 3a is the same as the racking out operation with the exception that racking screw 17 is rotated counter-clockwise.

U-shaped locking lever 110 prevents circuit breaker 10 from being racked into compartment 11 when the breaker contacts are engaged. This is performed as follows: When the breaker contacts are disengaged, the operating mechanism (a portion of which is shown) occupies the position shown in FIGURE 6. It can be seen from FIGURE 6 that no portion of blocking lever 110 lies in the plane of rotation of locking lever 114 so that locking lever 114 is free to rotate clockwise about the axis of locking shaft 112 (see FIGURE 3). However, when the circuit breaker contacts are engaged, arm 107 moves clockwise about shaft 105 to the position shown by phantom line 180 moving pivot 108 to the position of circuit 181. Pin 108 causes connecting member 109 to move to the left (see FIGURES 6 and 11). U-shaped locking lever 110 which is pivotally connected to connecting link 109 by pin 111 is forced to rotate counter-clockwise about shaft 130. When pin 111 (see FIGURE 11) moves from the position shown in FIGURE 6 to the position shown in FIGURE 11, U-shaped lever 110 is rotated to the position shown in FIGURE 11, moving corner 182 of U-shaped lever into the plane of rotation of locking lever 114. This prevents the operator from moving unlocking handle 113 to the left (see FIGURE 9) since blocking lever 114 is blocked from rotating clockwise by U-shaped lever 110, the opposite end of blocking lever 114 restraining rotational movement of both locking shaft 112 and unlocking handle 113. The locking of locking lever 114 in the position shown in FIGURE 9 shown by the solid lines, prevents projection 114a from being removed from aperture 17c thereby preventing the rotation of racking screw 17 when the circuit breaker contacts 49 are engaged.

Connecting arm 109 is bent to the right to form a flange 109a. This flange 109a abuts the arm 185 of counter 133 thereby increasing the total count registered by one each time circuit breaker 10 is closed resulting in an accurate count of the number of times circuit breaker 10 is tripped.

Bracket 186 is also connected to pin 111 and is free to rotate about shaft 130 in response to the movement of connecting arm 109. The left hand end of bracket 186 (see FIGURE 6) is bent to form surfaces 187 and 188. The word "closed" is printed on face 187 and the word "open" is printed on face 188. Bracket 186 is rotated between the position shown in FIGURE 6 and the position shown in FIGURE 11 when the circuit breaker 10 is in the tripped and closed positions respectively. An opening 189 on the front panel of carriage 100 (see FIGURE 9) exposes face 188 when the circuit breaker operating mechanism is in the position shown in FIGURE 6 and exposes face 187 when the operating mechanism is in the position shown in FIGURE 11. This feature permits the operator to immediately ascertain the condition of the breaker contacts. The opening 189 is so positioned (see FIGURE 1) that the circuit breaker condition may be read through opening 13 in compartment door 12 without need for opening the compartment door.

A further safety feature resides in the bell crank lever 116 (see FIGURE 9) which is linked to locking lever 114 by adjustable linking member 115. Bell crank lever 116 is connected to the manual tripping mechanism (not shown) at aperture 118. When the circuit breaker contacts 40 are in the closed position bell crank lever 116 assumes the position shown by the solid line in FIGURE 9. This prevents locking lever 114 from rotating clockwise about the axis of locking shaft 112 thereby preventing the rotation of racking screw 17. When circuit breaker 10 is tripped bell crank lever 116 assumes the position shown by dotted lines 138, to permit locking handle 114 to be rotated clockwise so that racking screw 17 may be rotated as was previously described. The portions 115b and 115c of connecting link 115 are threaded to permit periodic adjustment of the connecting link 115, thereby guaranteeing proper operation of bell crank lever 116 and locking lever 114.

If desired, operation of the locking lever 114 could be coordinated with the trip latch (not shown) of the circuit breaker 10, whereby, prior to the engagement of locking lever 114 with interfering U-shaped lever 110, the circuit breaker 10 will be automatically tripped to its disengaged position so as to prevent damage to the locking lever 114 by a forceful engagement with U-shaped lever 110.

It can be seen from the foregoing description that we have provided a novel racking mechanism for a metal-clad circuit breaker which permits simple and speedy racking of a circuit breaker and which always remains accessible to an opening in the compartment door throughout the racking operation due to its unique arrangement.

Although we have here described preferred embodiments of our novel invention, many variations and modifications will now be apparent to those skilled in the art, and we, therefore, prefer to be limited, not by the specific disclosure herein, but only by the appending claims.

We claim:

1. In a circuit breaker movable within a circuit breaker cubicle between a fully connected and fully disconnected position, the improvement comprising:
   (a) a racking screw mounted on said circuit breaker;
   (b) racking means operatively connected to said racking screw for selectively moving said breaker between said fully engaged and fully disengaged positions in response to rotation of said racking screw; said racking means causing said circuit breaker to move longitudinally relative to said circuit breaker cubicle and said racking screw, while said racking screw remains longitudinally motionless relative to said circuit breaker cubicle; said racking means including:
   a nut fixedly secured to said circuit breaker and threadably engaged with said racking screw;
   collar means fixedly mounted on said racking screw;
   a shaft mounted on said circuit breaker;
   a rotating member secured to said shaft;
   linking means connecting said collar to said rotating member;
   roller means pivotally mounted to said rotating member;
   bracket means fixedly secured to an inner surface of said circuit breaker cubicle;
   said roller being free to move through a limited arc within the confines of said bracket means;
   said nut, collar means, shaft, rotating member, linking means, roller means, and bracket means cooperating to move said circuit breaker upon rotation of said racking screw.

2. In combination:
   (a) a circuit breaker having a pair of cooperating contacts operable between an engaged and a disengaged position;
   (b) a circuit breaker cubicle, said circuit breaker movable within said circuit breaker cubicle between a fully connected and fully disconnected position;
   (c) a racking screw mounted on said circuit breaker;
   (d) racking means operatively connected to said racking screw for selectively moving said breaker between said fully engaged and fully disengaged positions in response to rotation of said racking screw; said racking means causing said circuit breaker to move longitudinally relative to said circuit breaker cubicle and said racking screw, while said racking screw remains longitudinally motionless relative to said circuit breaker cubicle;
   (e) positioning means operatively connected to said racking screw for automatically stopping and preventing further movement of said circuit breaker when said circuit breaker has reached the exact location of one of said circuit breaker positions;
   said positioning means including releasing means for releasing said positioning means to allow further movement of said circuit breaker;
   (f) and interlock means operatively associated with said positioning means for allowing said pair of cooperating contacts to assume said engaged position only when said circuit breaker is exactly located at one of said circuit breaker positions;
   (g) said interlock means additionally performing the function of preventing rotation of said racking screw when said cooperating contacts are in said engaged position.

3. The apparatus of claim 2 wherein said racking means comprises:
   a nut fixedly secured to said circuit breaker and threadably enaged with said racking screw;
   collar means fixedly mounted on said racking screw;
   a shaft mounted on said circuit breaker;
   a rotating member secured to said shaft;
   linking means connecting said collar to said rotating member;
   roller means pivotally mounted to said rotating member;
   bracket means fixedly secured to an inner surface of said circuit breaker cubicle;
   said roller being free to move through a limited arc within the confines of said bracket means;
   said nut, collar means, shaft, rotating member, linking means, roller means and bracket means cooperating to move said circuit breaker upon rotation of said racking screw.

4. The apparatus of claim 2 wherein said positioning means comprises:
   a locking shaft, parallelly spaced from, and secured to, said racking screw;
   a locking lever, one end of which is slidably mounted on and pivotally connected to said locking shaft, the other end of which is linked to said circuit breaker;
   said locking lever having a projection which engages one of several apertures provided in said racking screw corresponding to the said circuit breaker positions to prevent rotation of said racking screw;
   and an unlocking handle pivotally secured to said locking shaft wherein rotation of said unlocking handle rotates said locking shaft and consequently said locking lever to disengage said projection from said aperture to allow further rotation of said racking screw.

5. The apparatus of claim 4 and further including:
   additional interlock means operatively connected to said positioning means for further preventing operation of said positioning means when said contacts are in said engaged position.

6. The apparatus of claim 5 wherein said additional interlock means comprises:
   a linking member;
   biasing means;
   and a bell crank lever;
   said linking member being pivotally secured at one end to said locking lever, and at the other end to said bell crank lever;
   said biasing means being secured at one end to said linking member, and at the other end to said circuit breaker;
   said bell crank lever being pivotally secured to said circuit breaker and adapted to rotate between a first and second position corresponding respectively to the engaged and disengaged positions of said pair of cooperating contacts;
   said locking lever, linking member, biasing means, and bell crank lever cooperating to allow said locking lever to rotate only when said bell crank lever is in said second position.

(References on following page)

References Cited by the Examiner

UNITED STATES PATENTS

| | | | |
|---|---|---|---|
| 2,611,053 | 9/1952 | Wallace | 200—108 |
| 2,615,101 | 10/1952 | Caswell | 200—50 |
| 2,678,976 | 5/1954 | Caswell | 200—50 |
| 2,725,437 | 11/1955 | Fields et al. | 200—158 |
| 2,777,024 | 1/1957 | West | 200—50 |
| 2,794,873 | 6/1957 | Bank | 200—50 |
| 2,921,998 | 1/1960 | Pokorny | 200—50 |

KATHLEEN H. CLAFFY, *Primary Examiner.*

MAX L. LEVY, ROBERT K. SCHAEFER, BERNARD A. GILHEANY, *Examiners.*